US009446328B2

United States Patent
Stouffer et al.

(10) Patent No.: US 9,446,328 B2
(45) Date of Patent: Sep. 20, 2016

(54) FILTRATION MEDIUM COMPRISING A METAL-CONTAINING PARTICULATE

(71) Applicant: 3M INNOVATIVE PROPERTIES COMPANY, St. Paul, MN (US)

(72) Inventors: Mark R. Stouffer, Middletown, CT (US); Meredith McMurdo Doyle, St. Paul, MN (US); Allen R. Siedle, Bloomington, IN (US); Thomas E. Wood, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 137 days.

(21) Appl. No.: 14/362,029

(22) PCT Filed: Dec. 13, 2012

(86) PCT No.: PCT/US2012/069414
§ 371 (c)(1),
(2) Date: May 30, 2014

(87) PCT Pub. No.: WO2013/096079
PCT Pub. Date: Jun. 27, 2013

(65) Prior Publication Data
US 2014/0305870 A1    Oct. 16, 2014

Related U.S. Application Data

(60) Provisional application No. 61/578,967, filed on Dec. 22, 2011.

(51) Int. Cl.
| B01D 15/00 | (2006.01) |
| B01J 20/02 | (2006.01) |
| B01J 20/20 | (2006.01) |
| B01J 20/28 | (2006.01) |
| B01J 20/30 | (2006.01) |
| B01J 20/32 | (2006.01) |
| C02F 1/28  | (2006.01) |

(52) U.S. Cl.
CPC ............ B01D 15/00 (2013.01); B01J 20/0222 (2013.01); B01J 20/0229 (2013.01); B01J 20/0233 (2013.01); B01J 20/0237 (2013.01); B01J 20/0281 (2013.01); B01J 20/0285 (2013.01); B01J 20/0288 (2013.01); B01J 20/0292 (2013.01); B01J 20/0296 (2013.01); B01J 20/20 (2013.01); B01J 20/2803 (2013.01); B01J 20/3078 (2013.01); B01J 20/3204 (2013.01); B01J 20/3236 (2013.01); C02F 1/288 (2013.01); C02F 1/281 (2013.01); C02F 1/283 (2013.01); C02F 2303/185 (2013.01)

(58) Field of Classification Search
CPC . B01D 15/00; B01J 20/3204; B01J 20/0222; B01J 20/0292; B01J 20/0288; B01J 20/0233; B01J 20/0285; B01J 20/3236; B01J 20/0229; B01J 20/2803; B01J 20/0281; B01J 20/3078; B01J 20/20; B01J 20/0237; B01J 20/0296; C02F 1/288
See application file for complete search history.

(56) References Cited

U.S. PATENT DOCUMENTS

| 4,624,937 | A  | 11/1986 | Chou |
| 4,634,937 | A  | 1/1987  | Haferl |
| 5,338,458 | A  | 8/1994  | Carrubba |
| 5,504,050 | A  | 4/1996  | Hayden |
| 5,529,708 | A  | 6/1996  | Palmgren |
| 5,837,088 | A  | 11/1998 | Palmgren |
| 6,342,129 | B1 | 1/2002  | Vaughn |
| 6,630,016 | B2 | 10/2003 | Koslow |
| 6,699,393 | B2 | 3/2004  | Baker |
| 7,361,280 | B2 | 4/2008  | Baker |
| 2004/0147397 | A1 | 7/2004 | Miller |
| 2005/0006306 | A1 | 1/2005 | Noland et al. |
| 2005/0011827 | A1 | 1/2005 | Koslow |
| 2009/0039028 | A1 | 2/2009 | Eaton |
| 2009/0274893 | A1 | 11/2009 | Bommi |
| 2009/0314770 | A1 | 12/2009 | LaMarca |
| 2012/0171447 | A1 | 7/2012 | Ren et al. |

FOREIGN PATENT DOCUMENTS

| CN | 1509257       | 6/2004  |
| CN | 101804324     | 8/2010  |
| EP | 0 679 435     | 11/1995 |
| WO | WO 01-85827   | 11/2001 |
| WO | WO 2009-154678| 12/2009 |
| WO | WO 2012-061474| 5/2012  |

OTHER PUBLICATIONS

Do, "Hydrogen peroxide decomposition on manganese oxide (pyrolusite): Kinetics, intermediates and mechanism", Chemosphere, 2009, vol. 75, pp. 8-12.

Hasan, "Promotion of the hydrogen peroxide decomposition activity of manganese oxide catalysts", Applied Catalysis A: General, 1999, vol. 181, pp. 171-179.

(Continued)

*Primary Examiner* — Chester Barry
(74) *Attorney, Agent, or Firm* — Julie Lapos-Kuchar

(57) ABSTRACT

Described herein is a liquid filtration device is disclosed comprising a fluid conduit fluidly connecting a fluid inlet to a fluid outlet; and a water filtration medium disposed in the fluid conduit; the water filter medium comprising a metal-containing particulate, wherein the metal-containing particulate comprises a thermolysis product of a metal salt wherein the salt is selected from nitrogen-containing oxyanions, sulfur-containing anions, chlorides, phosphates, and combinations thereof; and methods of removing chloramines from aqueous solutions.

15 Claims, No Drawings

(56) References Cited

OTHER PUBLICATIONS

Krishnamurthy, "Powder processing of iron-filled UHMWPE", Modern Plastics, Dec. 1987, pp. 96-99.

Lin, "Catalytic Decomposition of Hydrogen Peroxide on Iron Oxide: Kinetics, Mechanism, and Implications", Environmental Science and Technology, 1998, vol. 32, pp. 1417-1423.

Mocho, "Heating Activated Carbon by Electromagnetic Induction", Carbon, 1996, vol. 34, No. 7, pp. 851-856.

Rudnev, Handbook of Induction Heating, 87 (2003).

Tang, "Characterization and catalytic application of highly dispersed manganese oxides supported on activated carbon", Journal of Molecular Catalysis A: Chemical, 2009, vol. 301, pp. 24-30.

Vikesland, "Reaction Pathways Involved in the Reduction of Monochloramine by Ferrous Iron", Environmental Science and Technologies, 2000, vol. 34, pp. 83-90.

Wang, "Adsorption and Desorption of Gold on the Magnetic Activated Carbon", Journal of Material Science and Technology, 1994, vol. 10, pp. 151-153.

International Search Report for PCT International Application No. PCT/US2012/069414, mailed on Mar. 22, 2013, 6pgs.

FILTRATION MEDIUM COMPRISING A METAL-CONTAINING PARTICULATE

CROSS REFERENCE TO RELATED APPLICATIONS

This application is a national stage filing under 35 U.S.C. 371 of PCT/US2012/069414, filed Dec. 13, 2012, which claims priority to U.S. Provisional Patent Application No. 61/578,967, filed Dec. 22, 2011, the disclosures of which are incorporated by reference in their entirety herein.

TECHNICAL FIELD

A filtration medium comprising a metal-containing particulate is described, wherein the metal-containing particulate comprises a thermolysis product of a metal salt, wherein the salt is selected from nitrogen-containing oxyanions, sulfur-containing anions, chlorides, phosphates, and combinations thereof.

BACKGROUND

Chloramine is commonly used in low concentration as a secondary disinfectant in municipal water distribution systems as an alternative to chlorination with free chlorine. Concerns over taste and odor of chloramine treated water have led to an increase in the demand for water filters with chloramine removal capabilities.

Carbon particles, such as activated carbon particles, have been used to remove chloramine from aqueous streams. Improvements in removal of chloramine can be achieved by reducing the mean particle diameter of the carbon and by increasing the carbon bed contact time. Although parameters such as contact time and mean particle diameter are known to affect chloramine removal efficiencies, more significant improvements are desired without significantly increasing the pressure drop of filtration media.

U.S. Pat. No. 5,338,458 (Carrubba et al.) discloses an improved process for the removal of chloramine from gas or liquid media by contacting the media with a catalytically-active carbonaceous char.

U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char.

SUMMARY

There is a desire to provide a filtration medium, which is less expensive and/or more efficient at the removal of chloramine than currently available filtration media. In some instances, there is also a desire to provide a solid block of carbon to remove chloramine. In other instances, there is a desire to have a granular material that may be used in a packed bed. In still other instances, there is a desire to provide a material that may be used in a web-form.

In one aspect, a liquid filtration device is disclosed comprising a fluid conduit fluidly connecting a fluid inlet to a fluid outlet; and a liquid filtration medium disposed in the fluid conduit; the liquid filter medium comprising a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof.

In another aspect, a method for removing chloramine from aqueous solutions is disclosed comprising: providing an aqueous solution comprising chloramine and contacting the aqueous solution with a composition comprising a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof.

In yet another aspect, a method of removing chloramine from aqueous solutions is disclosed comprising: heating a metal salt wherein the salt is selected from nitrogen-containing oxyanions, sulfur-containing anions, chlorides, phosphates, and combinations thereof to form a thermolysis product; cooling the thermolysis product; and contacting the cooled thermolysis product with an aqueous solution comprising chloramine.

In yet another aspect, a method of making a composite carbon article is described comprising: providing a mixture comprising (a) a metal-containing particulate wherein the metal-containing particulate comprises a thermolysis product of an iron salt, wherein the salt is selected from nitrogen-containing oxyanions, sulfur-containing anions, chlorides, phosphates, and combinations thereof; and (b) a melt-processable polymer; contacting the mixture with a high-frequency magnetic field, wherein the high-frequency magnetic field oscillates in a range from about $10^3$ Hz to about $10^{15}$ Hz.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a composition comprising a thermolysis product of a metal salt, wherein the salt is selected from nitrogen-containing oxyanions, sulfur-containing anions, chlorides, phosphates, and combinations thereof.

It has been found that such compositions may be useful for the removal of chloramine from aqueous solutions.

Thermolysis Product of Metal Salts

The metal salts of the present disclosure include those wherein the salt is selected from nitrogen-containing oxyanions, sulfur-containing anions, chlorides, phosphates, and combinations thereof. Preferable metal salts include those that are water soluble and have a thermal decomposition temperature below 1000° C., however higher temperatures may be employed.

The nitrogen-containing oxyanion salt may comprise a nitrate and/or a nitrite ion.

The sulfur-containing anions including oxyanions. The sulfur-containing salts may comprise sulfates, sulfamates, sulfites, bisulfates, bisulfites, and/or thiosulfates.

A chloride salt is a salt comprising a chloride anion, and a phosphate salt is a salt comprising a phosphate ion.

The metal portion of the metal salt may include any metal, however, metals that are acceptable for presence in drinking water are preferred. Exemplary metals include: copper, iron, silver, and manganese.

Exemplary metal salts of the present disclosure include: ferric nitrate, manganous sulfate, manganese nitrate, copper sulfate, and combinations thereof.

The present disclosure is directed toward the thermolysis product of a metal salt. Thermolysis involves heating the metal salt at or above the temperature at which the metal salt begins to lose metal-bound water, if present, and at which the anionic portion of the compound begins to decompose. As used herein a "thermolysis product" refers to a product that results from the dissociation or decomposition of a compound by heat. This thermolysis process is believed to change the nature of the metal salt to a material having a different stoichiometry, composition, and/or different chemical properties, wherein at least a portion of the salt is thermally decomposed and is removed by volatilization as a gas.

In one embodiment, upon thermolysis, the oxidation state of the metal changes. For example, in one embodiment of the present disclosure, the metal in the thermoylsis product comprises at least a portion of the metal with an oxidation state of, for example, $Cu^0$, $Cu^{+1}$, or $Fe^{+2}$.

Although not wanting to be bound by theory, in another embodiment, the thermolysis of the metal salt is thought to produce a material having active surface sites that exhibit enhanced activity for catalyzing the decomposition of chloramines. The production of these surface sites by thermolysis of the metal salt results in materials (such as are observed by X-ray diffraction analysis of the thermolysis product) with chloramine removal properties superior to those that result from utilizing similar metal compounds produced by non-thermolysis methods, e.g., metal oxides derived from more traditional methods or finely divided metals. In the present disclosure, the metal-containing particulate comprises the thermolysis product of a metal salt, wherein the salt is selected from nitrogen-containing oxyanions, sulfur-containing anions, chlorides, phosphates, and combinations thereof.

In one embodiment, the metal salt is thermally treated to form the thermolysis product.

In another embodiment, the metal salt is thermally treated in the presence of a support, for example, carbon substrates or inorganic oxide substrates. The metal salt may be impregnated into the support prior to thermolysis. For example, a metal salt may be dissolved in a solvent and the resulting solution contacted with the support. The impregnated support then may be heated to form a thermolysis product disposed on the surface (or surface of the pores) of a support.

In another embodiment, metal salts, which are not sufficiently soluble to dissolve in the solvent (i.e., do not completely dissolve in the volume of solvent used in the experiment) may be impregnated into the support by adding the metal salt and the support to the solvent. In time, the metal salt that is dissolved in the solvent can diffuse into the support and deposit thereon, so that the metal salt is incorporated into or onto the support over time.

As used herein "metal-containing particulate" includes both the thermolysis product of the metal salt and the thermolysis product of the metal salt disposed (continuously or discontinuously) on a carbon substrate or inorganic oxide substrate, such substrates can include granular materials, powder materials, fibers, tubes, and foams.

In one embodiment, it is preferable for the metal-containing particulate product to be porous. The porous nature will enable, for example, more surface area for chloramine removal. Preferably having a high surface area (e.g., at least 100, 500, 600 or even 700 $m^2/g$; and at most 1000, 1200, 1400, 1500, or even 1800 $m^2/g$ based on BET (Brunauer Emmet Teller method) nitrogen adsorption). Such high surface areas may be accomplished by using a highly porous carbon substrate or inorganic oxide substrate and/or by applying a physical technique applied (such as crushing or pulverizing) to decrease the particle size of the resulting product.

Carbon Substrates and Inorganic Oxide Substrates

In one embodiment, the thermolysis product is disposed on the surface of the support such as a carbon or inorganic oxide substrate. This may be advantageous because the carbon or inorganic oxide substrate can provide a support for the thermolysis product, which may penetrate into the substrate or reside at the surface of the substrate. Further the carbon or inorganic oxide substrate may also provide additional removal capabilities complementary to the chloramines removal, for example providing removal of organics, free chlorine, or metals.

The morphology of the carbon substrate is not particularly limited and may include a non-particulate, a particulate, or an aggregate. Additional exemplary morphologies include: a carbon block, a carbon monolith, foams, films, fibers, and nanoparticulates, such as nanotubes and nanospheres. A non-particulate is a substrate that is not composed of discernable, distinct particles. A particulate substrate is a substrate that has discernable particles, wherein the particle may be spherical or irregular in shape and has an average diameter of at least 0.1, 1, 5, 10, 20, or even 40 micrometers (μm) to at most 75 μm, 100 μm, 500 μm, 1 millimeter (mm), 2 mm, 4 mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology the carbon substrate will be selected based on the application. For example, particulate with a large particle size is desirable when the compositions of the present disclosure are used in applications requiring low pressure drops such as in beds through which gases or liquids are passed. In another example, particle sizes of 20 to 200 micrometers, may be preferable when used in a carbon block monolith.

Commercially available carbon substrates include: granular activated carbon available under the trade designation "RGC" by Mead Westvaco Corp, Richmond, Va. may be preferred in water treatment. Activated coconut carbon available under the trade designation "KURARAY PGW" by Kuraray Chemical Co., LTD, Okayama, Japan may also be used.

The size of the pores of the carbon substrate can be selected based on the application. The carbon substrate may be microporous carbon, macroporous carbon, mesoporous carbon, or a mixture thereof.

The carbon substrates can contain larger regions of crystalline, graphitic domains or they can be substantially disordered. Particularly useful are carbon substrates that are substantially disordered and have high surface areas. As used herein, substantially disordered means that the carbon substrate has in-plane domain sizes of about 1-10 nm.

In one embodiment, the carbon substrate is comprised of activated carbon, in other words carbon that has been processed to make it highly porous (i.e., having a large number of pores per unit volume), which thus, imparts a high surface area.

The morphology of the inorganic oxide substrate is not particularly limited and may include a non-particulate, a particulate, or an aggregate. Exemplary morphologies include: fibers and nanoparticles such as nanotubes and nanospheres.

The inorganic oxide substrate may comprise, for example, silicon dioxide (silica), zirconia, titania, ceria, alumina, iron oxide, zinc oxide, tin oxide, alumina/silica, zirconia-silica, clays, talc-containing materials, spinel-structured oxides such as magnesium aluminate or cobalt iron oxide or the like, and other binary or ternary oxides of aluminum or silicon with other metal oxide materials. Although the inorganic oxide may be essentially pure, it may contain small amounts of stabilizing ion such as ammonium and alkaline metal ions, or it may be a combination of oxides such as a combination of titania and zirconia.

The size of the pores of the inorganic oxide substrate can be selected based on the application. The inorganic oxide substrate may be microporous, macroporous, mesoporous, or a mixture thereof. Particularly useful are inorganic oxide substrates that have high surface areas.

The choice of support materials is quite broad and can include without limitation alumina, silica, zeolites, ion exchange resins and porous organic materials, activated carbon, metal oxides and metal oxide framework (MOF) materials, and inorganic oxides. All of these materials can be used in combination with one another or in combination with a carbon substrate.

Preparation of the Thermolysis Product

As previously mentioned, the metal salt is thermally treated alone or in the presence of a support to form the thermolysis product.

The thermal treatment may be conducted in an air environment or in an inert environment, such as in a nitrogen or argon environment.

The thermolysis temperature, the temperature at which the thermolysis reaction is conducted, may be conducted at a temperature of at least 200, 250, 300, 400, or even 500° C.; and at most 650, 700, 800, 900, 1000, 1200, or even 1400° C. Generally the temperature at which thermolysis is conducted may be determined, by first analyzing the material (e.g., the metal salt or the metal salt impregnated support) to be treated by differential thermal analysis/thermal gravimetric analysis (DTA/TGA) performed under controlled conditions (atmosphere and heating rate) to determine its thermal decomposition behavior. Then trials are performed by thermolyzing the material at various temperatures beginning with the onset temperature of decomposition to determine at what point and under what conditions (temperature, time and atmosphere) the most active material is formed.

In one embodiment, as the reaction temperature changes the thermolysis product of the metal salt changes and there may be a select temperature based on the metal salt and support used, if any, which offers a more efficient removal of chloramine. For example, excessive heating of the metal salt can result in "over-firing" of the reaction product, and the activity of the material can diminish. In one embodiment, the presence of a carbon support during the thermolysis treatment can alter the decomposition temperature.

Although the thermolysis product should only comprise elements present in the metal salt, small amounts of other elements may be present, due to impurities present in the metal salt, the support used, of any, and/or in atmosphere used during the thermal treatment. In one embodiment, the metal-containing particulate is substantially free (i.e., less than 5%, 2%, 1%, 0.1%, 0.05%, or even 0.01% of sulfur atoms based on the weight of the metal-containing particulate).

In one embodiment, the thermolysis product comprises sulfur. The addition of sulfur may be advantageous in some embodiments for the removal of chloramines. In one embodiment, the metal-containing particulate comprises a sulfur atom, which is derived from the sulfur-containing anion.

In one embodiment, the metal-containing particulate comprises more than 1.2, 1.3, 1.5, 1.8, 2.0, 4.0, 6.0, 8.0 or even 10.0 mass % sulfur based on the total mass of the metal-containing particulate.

In one embodiment, the metal-containing particulate of the present disclosure comprises less than 0.90, 0.80, 0.70, 0.50, 0.30, 0.10, 0.05, 0.01, or even 0.005 mass % nitrogen based on the total mass of the metal-containing particulate.

In one embodiment, the metal-containing particulate of the present disclosure comprises nitrogen and less than 0.50, 0.30, 0.10, 0.05, 0.01, or even 0.005 mass % sulfur based on the total mass of the carbon substrate.

In one embodiment, the metal-containing particulate of the present disclosure is substantially free of hydrogen, comprising less than 0.40, 0.30, 0.20, 0.10, 0.05, or even 0.01 mass % hydrogen based on the total mass of the metal-containing particulate.

Use

In one embodiment of the present disclosure, the metal-containing particulate is used as a filter medium. Because of the ability of the compositions of the present disclosure to remove chloramine, the compositions of the present disclosure may be used as a filtration media. Filtration methods as known in the art can be used.

Although the metal-containing particulate may be used in an uncontained (bulk-fashion), it is preferable that the metal-containing particulate be contained in some sort of support matrix and/or vessel for ease of use.

The metal-containing particulate of the present disclosure may be used in a powdered form, a granular form, or shaped into a desired form. For example, the metal-containing particulate may be a compressed blend of a carbon substrate, the thermolysis product of the metal salt and a binder material, such as a polyethylene, e.g., an ultra high molecular weight polyethylene, or a high-density polyethylene (HDPE). In another embodiment, the metal-containing particulate of the present disclosure may be loaded into web, such as a blown microfiber, which may or may not be compacted such as described in U.S. Publ. No. 2009/0039028 (Eaton et al.), herein incorporated by reference.

Because the metal-containing particulate may comprise a ferromagnetic material, in one embodiment, the metal-containing particulate may be part of a carbon support such as carbon particles, which can be heated by induction heating to form composite blocks. Typically in making a carbon block monolith, carbon particles are heated in an oven to fuse the carbon particles together. When using ferromagnetic material, a high frequency magnetic field may be used to heat the metal-containing particulate, causing the carbon support to become fused and form a carbon block monolith. In one embodiment, the magnetic field may oscillate at a frequency in a range from about $10^3$ Hz to about $10^{15}$ Hz.

The use of induction heating to prepare a composite block, may allow more uniform heating and better heat penetration to the core of the composite carbon block and/or increase manufacturing throughput of the carbon block composites. The levels of iron salts versus other metal salts may be varied to optimized the ferromagnetic properties and the chloramine removal properties of the material.

In one embodiment, the metal-containing particulate may be used to remove chloramines from a fluid stream, particularly a liquid fluid stream, more specifically, an aqueous fluid stream. Chloramines are formed from the aqueous reaction between ammonia and chlorine (hypochlorite). Thus, adding ammonia ($NH_3$) to a chlorination system converts chlorine to chloramines. Specifically, monochloramine, hereafter referred to as "chloramine," in low concentrations arise from the disinfection of potable water sources. In one embodiment, after contacting the aqueous solution with a composition comprising a metal-containing particulate, as disclosed herein, the resulting aqueous solution comprises a reduced amount of chloramines, for example, at least a 10, 20, 25, 30, 50, 70, 80, 90, 95, or even 100% chloramine reduction as measured by the Chloramine Removal Test, at 180 seconds described in the Example Section below. Note that as the particle size decreases, in general, the amount of removal of chloramine will increase due to the increase in surface area. For example, the percent removal of chloramines is at least 50, 70, 90, or even 99% reduction in 180 seconds with a median particle size of about 50 micrometers.

Previous publications, such as Vikesland, et al. in Environmental Science and Technologies, 200, 34, 83-90 have shown that the water soluble forms of the ferrous ion are responsible for the removal of chloramines in their materials. Unlike the prior art, in one embodiment of the present disclosure, the metal responsible for the chloramine removal activity in the metal-containing particulate has limited solubility in water (in other words, a solubility producing metal ion concentrations of less than 20 ppm, 10 ppm, 5 ppm, 2 ppm, 1 ppm, 0.5 ppm, or even 0.1 ppm). When the metal-containing particulate is washed with water, little to no metal is present in the wash water and the washed metal-containing particulate retains its activity for chloramine removal. In one embodiment, when the thermolysis product of a metal carboxylate is washed, it does not lose more than 5, 10, 15, 20, 30, 40, 50, or even 60% of its original activity for the removal of chloramines. Having an insoluble or limited solubility thermolysis product may be advantageous, because the metal would be immobilized, preventing leaching into the treated water, enable the metal-containing particulate to be conditioned prior to use, and/or generate longer lifetimes of the filtration media.

A non-limiting list of exemplary embodiments and combinations of exemplary embodiments of the present disclosure are disclosed below.

Embodiment 1

A liquid filtration device comprising a fluid conduit fluidly connecting a fluid inlet to a fluid outlet; and a liquid filtration medium disposed in the fluid conduit; the liquid filter medium comprising a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof.

Embodiment 2

The liquid filtration device of embodiment 1, wherein the nitrogen-containing oxyanions comprise a nitrate, a nitrite, and combinations thereof.

Embodiment 3

The liquid filtration device of embodiment 1, wherein the sulfur-containing anions comprise a sulfate, sulfamate, sulfite, bisulfate, bisulfite, thiosulfate, and combinations thereof.

Embodiment 4

The liquid filtration device of any one of the previous embodiments, wherein the metal-containing particulate is substantially free of sulfur atoms.

Embodiment 5

The liquid filtration device of embodiments 1 or 3, wherein the metal-containing particulate comprises a sulfur atom and the sulfur atom is derived from the sulfur-containing anion.

Embodiment 6

The liquid filtration device of any one of the previous embodiments, wherein the metal of the metal salt is copper, iron, manganese, silver, and combinations thereof.

Embodiment 7

The liquid filtration device of any one of the previous embodiments, wherein water filtration medium comprises a support.

Embodiment 8

The liquid filtration device of embodiment 7, wherein the thermolysis product is disposed on the surface of the support.

Embodiment 9

The liquid filtration device of any one of embodiments 7 to 8, wherein the support is selected from a carbonaceous solid, an inorganic oxide particle, or a fibrous particle.

Embodiment 10

The liquid filtration device of anyone of embodiments 8 or 9, wherein the support is an activated carbon.

Embodiment 11

The liquid filtration device of any one of the previous embodiments, wherein the thermolysis product of a metal salt is immobilized in the fluid conduit.

Embodiment 12

The liquid filtration device of any one of the previous embodiments, wherein the metal-containing particulate is porous.

Embodiment 13

The liquid filtration device of any one of the previous embodiments, wherein the metal-containing particulate comprises less than 0.90, mass % nitrogen based on the total mass of the metal-containing particulate.

Embodiment 14

The liquid filtration device of any one of the previous embodiments, wherein the metal-containing particulate comprises greater than 2.0 mass % sulfur based on the total mass of the metal-containing particulate.

Embodiment 15

A method for removing chloramine from aqueous solutions comprising: providing an aqueous solution comprising chloramine and contacting the aqueous solution with a composition comprising a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof.

Embodiment 16

The method of embodiment 15, wherein the nitrogen-containing oxyanions comprise a nitrate, a nitrite, and combinations thereof.

Embodiment 17

The method of embodiment 15, wherein the sulfur-containing anions comprises a sulfate, sulfamate, sulfite, bisulfate, bisulfite, thiosulfate, and combinations thereof.

Embodiment 18

The method of any one of embodiments 15 or 16, wherein the metal-containing particulate is substantially free of sulfur atoms.

Embodiment 19

The method of any one of embodiments 15 or 17, wherein the metal-containing particulate comprises a sulfur atom and the sulfur atom is derived from the sulfur-containing anion.

Embodiment 20

The method of any one of embodiments 15 to 19, wherein the metal of the metal salt is copper, iron, manganese, silver, and combinations thereof.

Embodiment 21

The method of any one of embodiments 15 to 20, wherein after contacting the aqueous solution with a composition comprising a metal-containing particulate, the resulting aqueous solution comprises a reduced amount of chloramine.

Embodiment 22

The method of any one of embodiments 15 to 21, wherein the metal-containing particulate comprises less than 0.90, mass % nitrogen based on the total mass of the metal-containing particulate.

Embodiment 23

The method of any one of embodiments 15 to 22, wherein the metal-containing particulate comprises greater than 2.0 mass % sulfur based on the total mass of the metal-containing particulate.

Embodiment 24

A method for removing chloramine from aqueous solutions comprising:
heating a metal salt wherein the salt is selected from nitrogen-containing oxyanions, sulfur-containing anions, chlorides, phosphates, and combinations thereof to form a thermolysis product;
cooling the thermolysis product; and
contacting the cooled thermolysis product with an aqueous solution comprising chloramine.

Embodiment 25

The method of embodiment 24, wherein the heating is conducted at a temperature of at least 200° C.

Embodiment 26

The method of any one of embodiments 24 to 25, wherein at least a portion of the metal salt is disposed on a support during the heating step.

Embodiment 27

The method of any one of embodiments 24 to 26, wherein the heating is conducted in an inert atmosphere.

Embodiment 28

The method of any one of embodiments 24 to 27, wherein the thermolysis product comprises less than 0.90, mass % nitrogen based on the total mass of the thermolysis product.

Embodiment 29

The method of any one of embodiments 24 to 28, wherein the thermolysis product comprises greater than 2.0 mass % sulfur based on the total mass of the thermolysis product.

Embodiment 30

A carbon block comprising: (a) a carbon support, (b) a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof, and (c) a binder.

Embodiment 31

The carbon block of embodiment 30, wherein the binder is selected from polyethylene.

Embodiment 32

A method of making a composite carbon article comprising:
providing a mixture comprising (a) a metal-containing particulate wherein the metal-containing particulate comprises a thermolysis product of a metal salt, wherein the salt is selected from nitrogen-containing oxyanions, sulfur-containing anions, chlorides, phosphates, and combinations thereof; and (b) a melt-processable polymer;

contacting the mixture with a high-frequency magnetic field, wherein the high-frequency magnetic field oscillates in a range from about $10^3$ Hz to about $10^{15}$ Hz.

Embodiment 33

The method of embodiment 32, wherein the melt-processable polymer is an ultra high molecular weight polyethylene.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: cc=cubic centimeters, g=gram, hr=hour, in=inch, kg=kilograms, min=minutes, mol=mole; M=molar, cm=centimeter, mm=millimeter, ml=milliliter, L=liter, N=normal, psi=pressure per square inch, MPa=megaPascals, and wt=weight.

Testing Methods

Apparent Density Determination

The apparent density of a sample (prepared according to Comparative Examples or the Examples according to the disclosure) was determined by tapping a weighed sample in a graduated cylinder until closest packing was achieved. The closest packing was deemed to occur when tapping did not produce a further decrease in volume of the carbon substrate sample.

Chloramine Test

The chloramine content of water samples was determined from the total chlorine content in the samples. Total chlorine (OCl⁻ and chloramines) concentration was measured by the DPD Total Chlorine Method, Hach Method 8167, which Hach Company claims to be equivalent to USEPA Method 330.5. The free chlorine (OCl-) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Colo.

Chloramine Preparation 3 ppm chloramine was prepared by adding the appropriate amount of commercial bleach (5.25% NaOCl) to deionized water. While stirring, 1.5 equivalents of a solution of ammonium chloride in water was added to the bleach solution and stirred for 1 hour. The pH was adjusted to 7.6 by the addition of NaOH or HCl and tested using a pH meter (obtained from Thermo Fisher Scientific, Inc., Waltham, Mass., under the trade designation "ORION 3-STAR").

Chloramine Removal Test

An aqueous chloramine test solution was prepared comprising 3 ppm +/−0.3 ppm $NH_2Cl$ (prepared as described above) at a pH about 7.6 at about 27° C. Immediately prior to the test, the initial total chlorine content of the aqueous chloramine test solution was measured as described in the Chloramine Test above. With continuous stirring, a 1.5 cc aliquot of a carbon substrate sample (i.e. a sample prepared according to Comparative Examples or the Examples according to the disclosure) was added to the aqueous chloramine test solution. Aliquots were measured by mass knowing the apparent density. Immediately after mixing, a timer was started. After 30 sec, a 5 mL-aliquot of mixture was removed and within 5 sec of removal, the mixture was passed through a 1-micrometer syringe filter to remove suspended solids. The chloramine content of the filtered aliquot was measured within 30 sec of taking the 5-mL aliquot as described above. Aliquots from the mixture were taken periodically over the course of 5 minutes and analyzed using the Chloramine Test as described above. The efficiency of the chloramine removal is reported as the % chloramine reduction determined by the equation:

$$\left(1 - \frac{[NH2Cl]\,filtered\,liquot}{[NH2Cl]\,initial}\right) \times 100$$

| Material | Discription |
|---|---|
| Carbon Substrate A | Activated carbon powder obtained from MeadWestvaco Specialty Chemicals, North Charleston, SC, under the trade designation "AQUAGUARD Powder". This carbon is sold specifically for chloramine reduction. |
| Carbon Substrate B (RGC) | Wood-based activated carbon powder MeadWestvaco Specialty Chemicals, North Charleston, SC, under the trade designation "RGC Powder". |
| Carbon Substrate C | Coconut-shell-based activated carbon powder, obtained from Kuraray Chemical, Osaka Japan under the trade designation "PGWH-100MD". |
| Carbon Substrate D | Wood-based activated carbon powder MeadWestvaco Specialty Chemicals, North Charleston, SC, under the trade designation "RGC 80 x 325 mesh". |
| $Fe(NO_3)_3 \cdot 9H_2O$ | Ferric Nitrate 9-Hydate Crystal, ACS Reagent grade, obtained from from J. T. Baker, a division of Covidien, Phillipsburg, NJ. |
| $MnSO_4 \cdot H_2O$ | Manganous Sulfate Monohydrate Powder, ACS Reagent grade obtained from J. T. Baker. |
| $CuSO_4 \cdot 5H_2O$ | Copper Sulfate Pentahydrate, Purified Grade, obtained from VWR International LLC, Tadnor, PA. |
| $Cu(NO_3)_2 \cdot 2.5H_2O$ | Cupric Nitrate, 2.5-Hydrate, J-T Baker, Mallinckrodt Baker, Inc, Phillipsburg, NJ |

Comparative Examples A-C

Carbon Substrates A, B, and C were tested, without further treatment, using the Chloroamine Removal Test. The results are shown in Table 1.

Example 1

$MnSO_4 \cdot H_2O$ (6.75 g) was added to deionized water (35 g) with vigorous stirring. The aqueous manganese sulfate solution was added to 17.5 g of Carbon Substrate B with stirring.

The impregnated carbon was placed in a crucible (with lid) and was then heated in a nitrogen-purged muffle furnace at 875° C. for 15 minutes. The crucible was then removed to cool under a nitrogen purge. The impregnation resulted in approximately 12.5% wt manganese (as Mn) on the carbon. The sample was then tested using the Chloroamine Removal Test. The result is shown in Table 1.

Example 2

An impregnated carbon sample was prepared by the method of Example 1, but using a lower amount of $MnSO_4 \cdot H_2O$, such that the impregnation resulted in approximately 6.3 wt % manganese (as Mn) on the carbon. The sample was then tested using the Chloroamine Removal Test. The result is shown in Table 1.

Example 3

An impregnated carbon sample were prepared by the method of Example 1, but using a larger amount of $MnSO_4 \cdot H_2O$, such that the impregnation resulted in approximately 18.9 wt % manganese (as Mn) on the carbon. The sample was then tested using the Chloroamine Removal Test. The result is shown in Table 1.

Example 4

Following the same procedure outlined in Example 1, an aqueous manganese sulfate solution was added to Carbon Substrate C such that the impregnation resulted in approximately 19 wt % manganese (as Mn) on the carbon. The sample was then tested using the Chloroamine Removal Test. The result is shown in Table 1.

Example 5

Copper sulfate pentahydrate (5 g of $CuSO_4 \cdot 5H_2O$) was dissolved in 15 g water. The solution was added to the Carbon Substrate B (8.5 gram) with stirring such that the impregnation resulted in approximately 12.5% copper (as Cu) on the carbon. The impregnated carbon was placed in a crucible (with lid) and was then heated in a nitrogen-purged muffle furnace at 800° C. for 15 minutes. The crucible was then removed to cool under a nitrogen purge. The sample was then tested using the Chloroamine Removal Test. The result is shown in Table 1.

TABLE 1

| Example | Carbon Substrate | % by wt metal impregnate | % Chloramine Reduction At 150 sec | At 180 sec |
|---|---|---|---|---|
| Comp. Example A | A | 0 | 83 | 89 |
| Comp. Example B | B | 0 | 39 | 42 |
| Example 1 | B | 12.5 (Mn) | 78 | 87 |
| Example 2 | B | 6.3 (Mn) | 69 | 72 |
| Example 3 | B | 18.9 (Mn) | 98 | 99 |
| Example 5 | B | 15 (Cu) | 96 | 98 |
| Example 6 | B | 20 (Fe) | 76 | 80 |
| Comp. Example C | C | 0 | 41 | 52 |
| Example 4 | C | 19 (Mn) | 74 | 79 |

Example 6

Iron nitrate (14.5 g of $Fe(NO_3)_3 \cdot 9H_2O$) was dissolved in 20 g water. Half of the solution was added to the Carbon Substrate B (8 gram). The impregnated carbon substrate was then dried at 100° C. The remainder of the iron salt solution was added to the impregnated carbon resulting in approximately 20% iron on the carbon. The impregnated carbon was then heated at 900° C. in $N_2$ for 15 minutes (in closed crucibles in a nitrogen purged muffle furnace). The sample was then tested using the Chloroamine Removal Test. The result is shown in Table 1 above.

Example 6 was tested for ferromagnetism. A small bar magnet was held above Example 6. When the magnet was about 0.25 inches (0.6 centimeters) from the sample, the carbon particles comprising the thermolysis product of the iron nitrate were attracted to the magnet.

Example 6

0.374 g $Cu(NO_3)_2 \cdot 2.5H_2O$ was dissolved in 8 mL of deionized water. The solution was added to Carbon Substrate B (5.0 g). The sample was dried in an oven at 90° C. and subsequently heated to 300° C. in a tube furnace purged with $N_2$. The sample was cooled in $N_2$ to room temperature prior to removing from the furnace.

Example 7

The same process and disclosed in Example 6 was used except that 0.960 g of $Cu(NO_3)_2 \cdot 2.5H_2O$ was used.

Example 8

The same process and disclosed in Example 6 was used except that 2.03 g of $Cu(NO_3)_2 \cdot 2.5H_2O$ was used.

Example 9

The same process and disclosed in Example 6 was used except that 3.23 g of $Cu(NO_3)_2 \cdot 2.5H_2O$ was used.

Example 10

The same process and disclosed in Example 6 was used except that Carbon Substrate D was used in place of Carbon Substrate B.

Example 11

The same process and disclosed in Example 7 was used except that Carbon Substrate D was used in place of Carbon Substrate B.

Example 12

The same process and disclosed in Example 8 was used except that Carbon Substrate D was used in place of Carbon Substrate B.

Example 13

The same process and disclosed in Example 9 was used except that Carbon Substrate D was used in place of Carbon Substrate B.

Examples 6-13 and Carbon Substrate D (comparative Example D) were then tested using the Chloroamine Removal Test. The results are shown in Table 2.

TABLE 2

| Example | Carbon Substrate | % by wt copper impregnate | % Chloramine Reduction | |
|---|---|---|---|---|
| | | | At 120 s | At 180 s |
| 6 | B | 2 | 65 | 74 |
| 7 | B | 5 | 81 | 84 |
| 8 | B | 10 | 84 | 90 |
| 9 | B | 15 | 81 | 87 |
| 10 | D | 2 | 45 | 55 |
| 11 | D | 5 | 45 | 58 |
| 12 | D | 10 | 42 | 55 |
| 13 | D | 15 | 42 | 52 |
| Comp. Example D | D | 0 | 7 | 7 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A method for removing chloramine from aqueous solutions comprising: providing an aqueous solution comprising chloramine and contacting the aqueous solution with a composition comprising a metal-containing particulate, wherein the metal-containing particulate comprises a thermolysis product of a metal salt, wherein the salt is selected from nitrogen-containing oxyanions, sulfur-containing anions, chlorides, phosphates, and combinations thereof.

2. The method of claim 1, wherein the nitrogen-containing oxyanions comprise a nitrate, a nitrite, and combinations thereof.

3. The method of claim 1, wherein the sulfur-containing anions comprise a sulfate, sulfamate, sulfite, bisulfate, bisulfate, thiosulfate, and combinations thereof.

4. The method of claim 1, wherein the metal-containing particulate is substantially free of sulfur atoms.

5. The method of claim 1, wherein the metal-containing particulate comprises a sulfur atom and the sulfur atom is derived from the sulfur-containing anion.

6. The method of claim 1, wherein the metal of the metal salt is copper, iron, manganese, silver, and combinations thereof.

7. The method of claim 1, wherein the thermolysis product is disposed on the surface of a support.

8. The method of claim 7, wherein the support is selected from a carbonaceous solid, an inorganic oxide particle, or a fibrous particle.

9. The method of claim 7, wherein the support is an activated carbon.

10. The method of claim 1, wherein the thermolysis product of a metal salt is immobilized in a fluid conduit.

11. The method of claim 1, wherein the metal-containing particulate is porous.

12. The method of claim 1, wherein the metal-containing particulate comprises less than 0.90, mass % nitrogen based on the total mass of the metal-containing particulate.

13. The method of claim 1, wherein the metal-containing particulate comprises greater than 2.0 mass % sulfur based on the total mass of the metal-containing particulate.

14. The method of claim 1, wherein after contacting the aqueous solution with a composition comprising a metal-containing particulate, the resulting aqueous solution comprises a reduced amount of chloramine.

15. A method for removing chloramine from aqueous solutions comprising:
heating a metal salt wherein the salt is selected from nitrogen-containing oxyanions, sulfur-containing anions, chlorides, phosphates, and combinations thereof to form a thermolysis product;
cooling the thermolysis product; and
contacting the cooled thermolysis product with an aqueous solution comprising chloramine.

* * * * *

UNITED STATES PATENT AND TRADEMARK OFFICE
CERTIFICATE OF CORRECTION

PATENT NO.         : 9,446,328 B2                                    Page 1 of 1
APPLICATION NO.    : 14/362029
DATED              : September 20, 2016
INVENTOR(S)        : Stouffer et al.

It is certified that error appears in the above-identified patent and that said Letters Patent is hereby corrected as shown below:

In the Specification

Column 12,
Line 32, delete "Discription" and insert -- Description --, therefor.
Line 60, delete "Chloroamine" and insert -- Chloramine --, therefor.

Column 13,
Line 6, delete "Chloroamine" and insert -- Chloramine --, therefor.
Line 15, delete "Chloroamine" and insert -- Chloramine --, therefor.
Line 24, delete "Chloroamine" and insert -- Chloramine --, therefor.
Line 33, delete "Chloroamine" and insert -- Chloramine --, therefor.
Line 46, delete "Chloroamine" and insert -- Chloramine --, therefor.

Column 14,
Line 7, delete "Chloroamine" and insert -- Chloramine --, therefor.
Line 66, delete "Chloroamine" and insert -- Chloramine --, therefor.

In the Claims

Column 15,
Lines 38 and 39, in Claim 3, delete "bisulfate," and insert -- bisulfite, --, therefor.

Signed and Sealed this
Seventh Day of February, 2017

Michelle K. Lee
*Director of the United States Patent and Trademark Office*